(12) United States Patent
Jung

(10) Patent No.: US 10,627,669 B2
(45) Date of Patent: Apr. 21, 2020

(54) OPTICAL FILM AND LIQUID CRYSTAL DISPLAY DEVICE INCLUDING THE SAME

(71) Applicant: LG Display Co., Ltd., Seoul (KR)

(72) Inventor: Yeoun-Jei Jung, Daegu (KR)

(73) Assignee: LG Display Co., Ltd., Seoul (KR)

( * ) Notice: Subject to any disclaimer, the term of this patent is extended or adjusted under 35 U.S.C. 154(b) by 85 days.

(21) Appl. No.: 15/252,046

(22) Filed: Aug. 30, 2016

(65) Prior Publication Data

US 2017/0059934 A1    Mar. 2, 2017

(30) Foreign Application Priority Data

Aug. 31, 2015   (KR) .......................... 10-2015-0123010

(51) Int. Cl.
*G02F 1/1335*    (2006.01)

(52) U.S. Cl.
CPC .................. *G02F 1/133536* (2013.01); *G02F 2001/133531* (2013.01)

(58) Field of Classification Search
CPC ......... G02F 1/133553; G02F 1/133536; G02F 2001/133531
See application file for complete search history.

(56) References Cited

U.S. PATENT DOCUMENTS

| | | | | |
|---|---|---|---|---|
| 6,111,696 A | * | 8/2000 | Allen | G02B 5/3008 |
| | | | | 349/96 |
| 7,633,679 B2 | * | 12/2009 | Mi | G02B 5/045 |
| | | | | 359/485.02 |
| 8,363,181 B2 | * | 1/2013 | Nasu | G02B 6/0053 |
| | | | | 349/62 |
| 9,086,542 B2 | * | 7/2015 | Miyatake | G02B 5/3033 |
| 2010/0066944 A1 | * | 3/2010 | Mei | G02B 5/0231 |
| | | | | 349/62 |
| 2013/0038821 A1 | * | 2/2013 | Wu | G02F 1/133504 |
| | | | | 349/96 |
| 2015/0301264 A1 | * | 10/2015 | Min | G02B 5/0231 |
| | | | | 362/343 |
| 2017/0045655 A1 | * | 2/2017 | Zhou | B32B 27/08 |

\* cited by examiner

*Primary Examiner* — Dung T Nguyen
(74) *Attorney, Agent, or Firm* — Seed IP Law Group LLP

(57) ABSTRACT

An optical film includes a prism part having a plurality of prism patterns obliquely arranged in rows on a multilayer-structured reflective polarizing part. The reflective polarizing part is configured to reflect light from a first polarization axis and transmit light through a second polarization axis perpendicular to the first polarization axis. The rows of the prism patterns are arranged at a predetermined angle of inclination relative to the second polarization axis to reduce a Moiré phenomenon. The optical film may be adopted in a liquid crystal display device including a backlight unit to transmit light to a liquid crystal panel. A first polarizing plate is disposed between the optical film and the liquid crystal panel, and has a transmission axis that coincides with the second polarization axis of the reflective polarizing part to maximize light transmission from the backlight unit to the liquid crystal display.

6 Claims, 5 Drawing Sheets

OPTICAL FILM AND LIQUID CRYSTAL DISPLAY DEVICE INCLUDING THE SAME

This application claims the benefit of Korean Patent Application No. P2015-123010, filed on Aug. 31, 2015, which is hereby incorporated by reference as if fully set forth herein.

BACKGROUND OF THE INVENTION

Field of the Invention

The present invention relates to an optical film for concentrating light, and a liquid crystal display device including the same.

Discussion of the Related Art

As the information age has arrived, the field of displays that visually display electrical signals containing information has rapidly developed. Accordingly, various flat display devices having excellent features such as thinness, light weight, and low power consumption have been continuously developed.

As representative examples of the flat display devices, there are an LCD (Liquid Crystal Display) device, a PDP (Plasma Display Panel) device, an FED (Field Emission Display) device, an ELD (Electro Luminescence Display) device, an EWD (Electro-Wetting Display) device, an OLED (Organic Light Emitting Display) device, etc.

Among them, the LCD device includes a liquid crystal panel, which includes a pair of substrates and a liquid crystal layer made of liquid crystal injected therebetween. The liquid crystal panel defines a plurality of pixel areas which are arranged in a matrix form on a display area. That is, the LCD device displays an image by adjusting the light transmittance of each pixel area using the optical anisotropy and polarization of the liquid crystal.

Since the LCD device is not a self-emission device which emits light by itself, it may further include a separate light source. By way of example, a transmission-type LCD device further includes a backlight unit which is disposed beneath a liquid crystal panel to irradiate the liquid crystal panel with light.

The backlight unit includes a light source, a light guide plate which converts light emitted from the light source into a surface light source corresponding to the liquid crystal panel, and a plurality of optical films disposed on the light guide plate. In this case, each of the optical films includes a diffusion sheet which diffuses light in order to increase the uniformity of light emitted from the backlight unit, and a prism sheet which concentrates light in order to adjust a viewing angle. Here, the prism sheet includes a plurality of prism patterns arranged parallel to each other.

FIGS. 1A and 1B are top views illustrating pixel areas arranged in a matrix form and prism patterns arranged in the row direction of the pixel areas.

As illustrated in FIG. 1A, when a plurality of prism patterns PP is arranged in the same direction as the row or column direction of a plurality of pixel areas PA, the arrangement of the prism patterns PP overlaps the arrangement of the pixel areas PA. That is, when the prism patterns PP are arranged parallel to the column or row direction of the pixel areas, the arrangement of the prism patterns PP interferes with the arrangement of the pixel areas PA, which may cause a Moiré phenomenon.

In particular, as illustrated in FIG. 1B, the higher the resolution of an LCD device, the higher the density at which a plurality of pixel areas PA' is arranged. Hence, the arrangement of the prism patterns PP increasingly interferes with the arrangement of the pixel areas PA', which may lead to a stronger Moiré phenomenon.

SUMMARY OF THE INVENTION

Accordingly, the present invention is directed to an optical film and a liquid crystal display device including the same that reduce one or more problems due to limitations and disadvantages of the related art.

An object of the present invention is to provide an optical film capable of reducing a Moiré phenomenon, and a liquid crystal display device including the same.

Additional advantages, objects, and features of the invention will be set forth in the description which follows and will also become apparent to those having ordinary skill in the art upon examination of the following description or may be learned from practice of the invention as taught herein. Other objectives and advantages of the invention may be realized and attained by the structure particularly pointed out in the written description and claims hereof as well as the appended drawings.

In accordance with the present invention, the above and other objects can be accomplished by the provision of an optical film including a prism part including a plurality of prism patterns arranged at an incline relative to a transmission axis of a reflective polarizing part, and a liquid crystal display device including the same.

In an aspect of the present invention, an optical film includes a multilayer-structured reflective polarizing part configured to reflect light from a first polarization axis and transmit light through a second polarization axis perpendicular to the first polarization axis, and a prism part including a plurality of prism patterns arranged at an incline relative to the second polarization axis.

The prism patterns may be arranged so as to be inclined at an angle of 30° to 60° relative to the second polarization axis passing through the reflective polarizing part.

In another aspect of the present invention, a liquid crystal display device includes the optical film, a first polarizing plate disposed on the optical film, and a liquid crystal panel disposed on the first polarizing plate.

A transmission axis of the first polarizing plate may coincide with the second polarization axis passing through the reflective polarizing part.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to an optical film and a liquid crystal display device including the same according to exemplary embodiments of the present invention, examples of which are illustrated in the accompanying drawings.

First, an optical film according to an embodiment of the present invention will be described with reference to FIGS. 2 to 4.

Figure 1A:
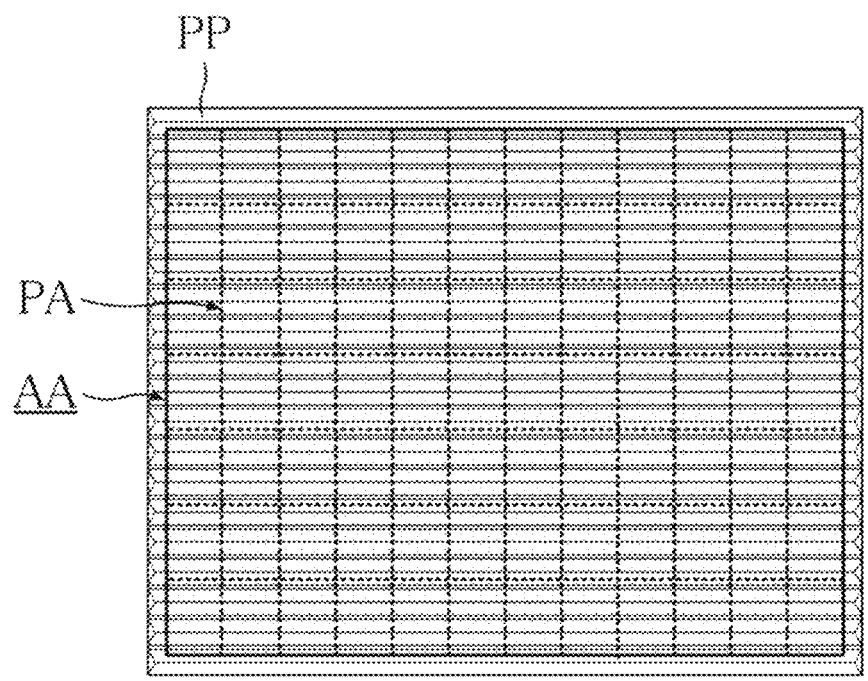
FIGS. 1A and 1B are top views illustrating pixel areas arranged in a matrix form and prism patterns arranged in the row direction of the pixel areas.
Figure 1B:
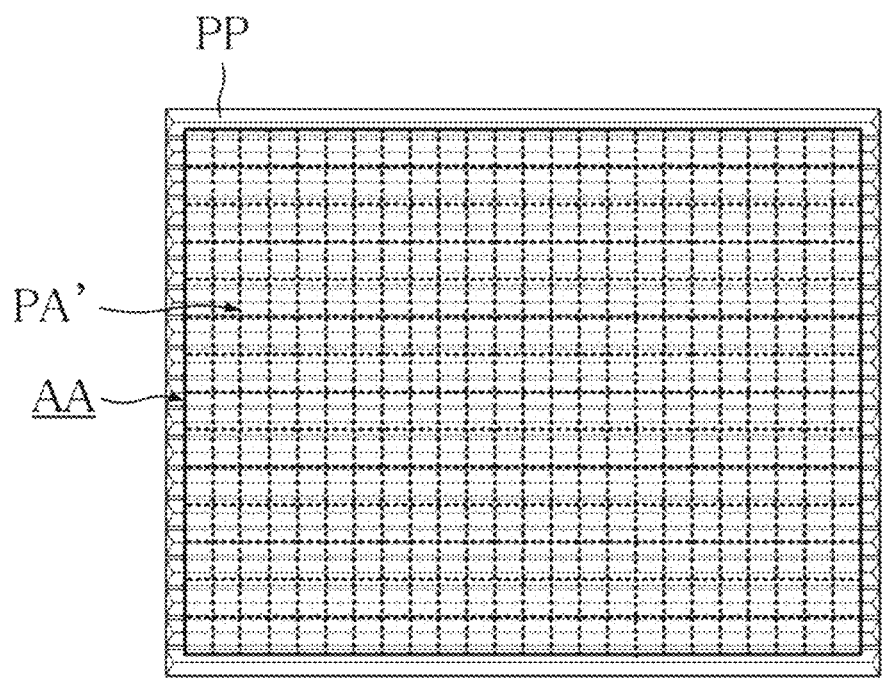
Figure 2:
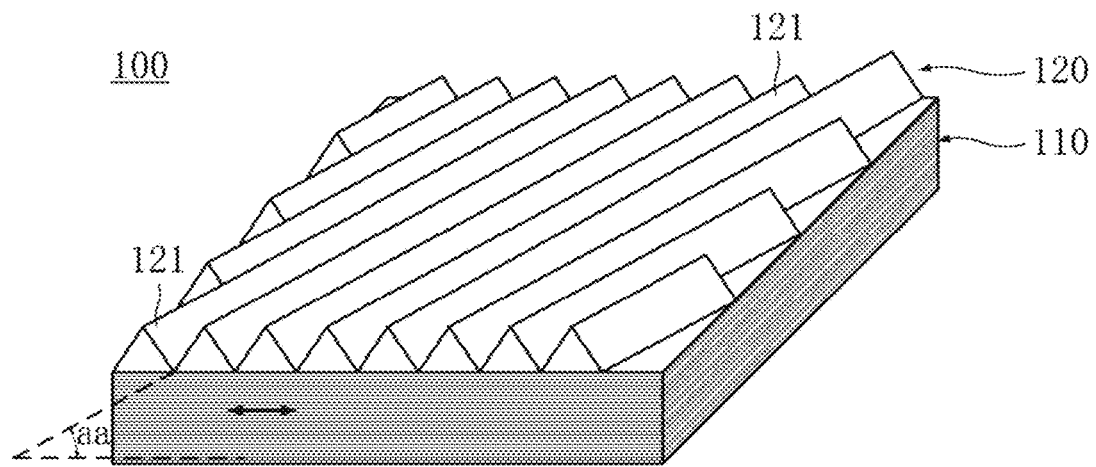
FIG. 2 is a perspective view illustrating an optical film according to an embodiment of the present invention.

FIG. 2 is a perspective view illustrating an optical film according to an embodiment of the present invention. FIG. 3 is a top view of FIG. 2. FIG. 4 is a top view illustrating pixel areas arranged in a matrix form and prism patterns of FIG. 3.

As illustrated in FIG. 2, the optical film, which is designated by reference numeral 100, according to the embodiment of the present invention includes a reflective polarizing part 110 having a multilayer structure, and a prism part 120 which consists of a plurality of prism patterns 121 arranged parallel to each other.

The reflective polarizing part 110 has a multilayer structure in which a plurality of material layers having different indices of refraction is alternately laminated. That is, the reflective polarizing part 110 is provided as an MOF (Multilayer Optical Film).

In detail, the reflective polarizing part 110 includes several to hundreds of material layers, of which the different indices of refraction do not match each other along a first polarization axis but match each other along a second polarization axis.

Thus, the reflective polarizing part 110 reflects light from the first polarization axis and transmits light through the second polarization axis. That is, the second polarization axis is a transmission axis of the reflective polarizing part 110, as indicated by the horizontal arrow in FIG. 2.

The prism part 120 includes the prism patterns 121 which are arranged so as to be inclined at a predetermined aligned angle (aa) relative to the second polarization axis.

Each of the prism patterns 121 has a polygonal prism shape. For example, the prism pattern 121 may have a triangular prism shape, but this is intended to be exemplary only. Although not shown separately, the prism pattern 121 may have a polygonal prism shape such as a trapezoidal prism shape.

The sides (prismatic portions) of the respective prism patterns 121 are in contact with the reflective polarizing part 110.

As illustrated in FIG. 2, the each prism pattern 121 extends in a longitudinal direction, having a longitudinal axis. The plurality of prism patterns 121 are arranged side-by-side, parallel to each other in the form of rows. The longitudinal axis of the rows are arranged so as to be inclined at an aligned angle of 30° to 60° relative to the second polarization axis passing through the reflective polarizing part 110 (hereinafter, the second polarization axis being also referred to as "transmission axis of reflective polarizing part", being indicated by "the horizontal arrow" in FIG. 2).

As such, since the prism patterns 121 are tilted at an aligned angle of 30° to 60° relative to the transmission axis of the reflective polarizing part 110 (the second polarization axis), a Moiré phenomenon caused by the optical film 100 can be reduced. Namely, the rows of the prism patterns have a longitudinal axis that extends at an angle relative to the transmission axis of the polarizing layer 110.

Figure 4:
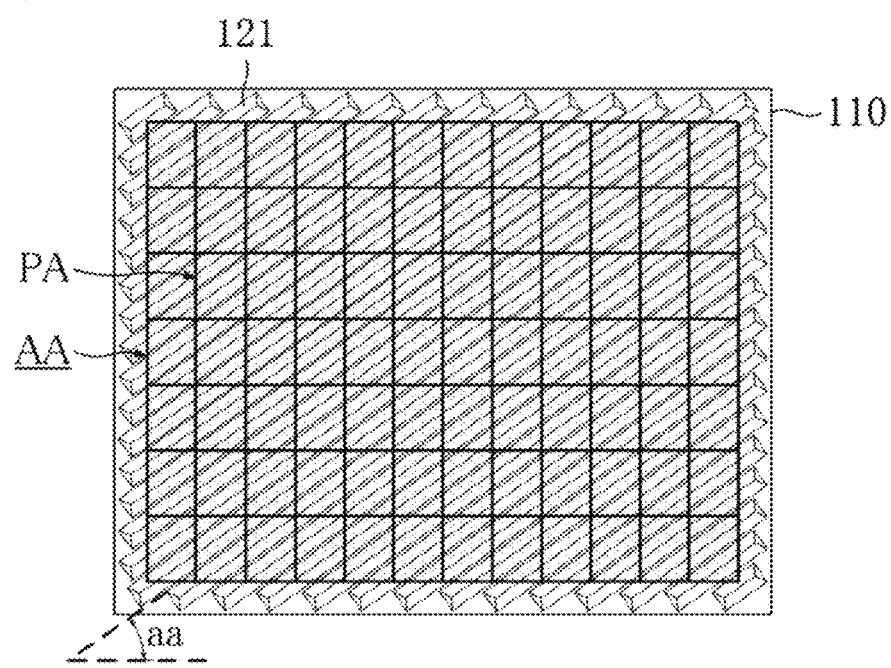
FIG. 4 is a top view illustrating pixel areas arranged in a matrix form and prism patterns of FIG. 3.

That is, as illustrated in FIG. 4, the prism patterns 121 are arranged so as to be inclined at a predetermined aligned angle (aa) according to the embodiment of the present invention, with the consequence that they do not match the row or column arrangement of a plurality of pixel areas PA.

Thus, since the arrangement of the prism patterns 121 does not overlap the arrangement of the pixel areas PA, it is possible to reduce a Moiré phenomenon.

In particular, the aligned angle (aa) at which rows of the prism patterns 121 are tilted relative to the transmission axis of the reflective polarizing part 110 (the second polarization axis) may be an angle of 30° to 60°. Therefore, even when the optical film 100 is applied to an LCD device having high resolution, the optical film 100 can prevent a stronger Moiré phenomenon.

Specifically, in the optical film 100 according to the embodiment of the present invention, since the rows of the prism patterns 121 are arranged at an incline relative to the transmission axis of the reflective polarizing part 110 (the second polarization axis), the prism patterns 121 do not match the row or column arrangement of the pixel areas PA. Therefore, a Moiré phenomenon caused by the optical film 100 can be reduced.

According to the embodiment of the present invention, the rows of the prism patterns 121 are arranged so as to be inclined at an aligned angle (aa) of 30° to 60° relative to the transmission axis of the reflective polarizing part 110 (the second polarization axis). Accordingly, even when the optical film 100 is applied to a high-resolution LCD device having pixel areas arranged at several times the density of those of a low-resolution LCD device, the optical film 100 can prevent a stronger Moiré phenomenon from occurring. Therefore, the optical film 100 has an advantage of being applicable to such a high-resolution LCD device.

As described above, the optical film 100 according to the embodiment of the present invention includes the prism part 120 including the prism patterns 121 which have rows that are obliquely arranged relative to the transmission axis of the reflective polarizing part 110. Accordingly, since the arrangement of the prism patterns 121 included in the optical film 100 does not match the row or column arrangement of the pixel areas PA, the interference between the arrangement of the prism patterns 121 and the arrangement of the pixel areas PA is reduced, thereby preventing a Moiré phenomenon.

In addition, the prism patterns 121 are tilted at an aligned angle (aa) of 30° to 60° relative to the transmission axis of the reflective polarizing part 110, which coincides with one of the row and column arrangements of the pixel areas PA. Therefore, even when the optical film 100 is applied to an LCD device having high resolution, it is possible to prevent a Moiré phenomenon.

Next, an LCD device including an optical film according to exemplary embodiment of the present invention will be described with reference to FIGS. 5 to 7.

Figure 5:
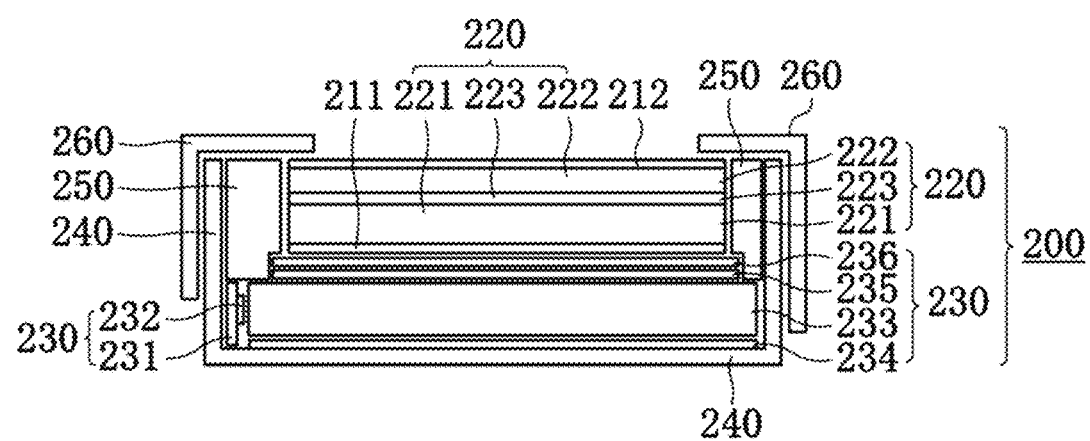
FIG. 5 is a cross-sectional view illustrating an example of an LCD device including an optical film according to another embodiment of the present invention.

FIG. 5 is a cross-sectional view illustrating an example of an LCD device including an optical film according to exemplary embodiment of the present invention. FIG. 6 is a view illustrating an example of a transmission axis of a reflective polarizing part, a prism part, and a transmission axis of a lower polarizing plate in FIG. 5. FIG. 7 is a graph illustrating variation in luminance depending on the angle at which the transmission axis of the reflective polarizing part is tilted relative to the transmission axis of the lower polarizing plate.

As illustrated in FIG. 5, the LCD device, which is designated by reference numeral 200, according to the embodiment of the present invention includes an optical film 236 (100 in FIGS. 2 to 4), a first polarizing plate 211 which is disposed on the optical film 236, and a liquid crystal panel 220 which is disposed on the first polarizing plate 211.

In detail, the LCD device 200 includes a liquid crystal panel 220, first and second polarizing plates 211 and 212 which are disposed in the upper and lower portions of the liquid crystal panel 220, a backlight unit 230 which is disposed beneath the liquid crystal panel 220 to irradiate the liquid crystal panel 220 with light, a bottom cover 240 which is disposed beneath the backlight unit 230, a guide panel 250 which surrounds the side of the liquid crystal panel 220, and a top cover 260 which is disposed above the liquid crystal panel 220.

The liquid crystal panel 220 includes a pair of substrates 221 and 222, which face and are bonded to each other, and a liquid crystal layer 223 injected therebetween.

Although not specifically shown in FIG. 5, when the liquid crystal panel 220 is driven in an active matrix manner, one of the substrates 221 and 222 may be a thin-film transistor array substrate, which defines a plurality of pixel areas and includes a plurality of thin-film transistors corresponding to the pixel areas.

When a color image is displayed by the liquid crystal panel 220, the liquid crystal panel 220 may further include a color filter layer, which is disposed between the substrates 221 and 222 and allows at least red, green, and blue light to be emitted through the respective pixel areas.

The first polarizing plate 211 is disposed in the lower portion of the liquid crystal panel 220, and polarizes light radiated to the liquid crystal panel 220 from the backlight unit 230.

In this case, a transmission axis of the first polarizing plate 211 coincides with a second polarization axis (indicated by the horizontal arrow in FIG. 2) passing through a reflective polarizing part 110 of the optical film 236. That is, the transmission axis of the first polarizing plate 211 coincides with the transmission axis of the reflective polarizing part 110 of the optical film 236. Consequently, the optical film 236 can prevent deterioration of luminance. A detailed description thereof will be given below.

The second polarizing plate 212 polarizes light emitted from the liquid crystal panel 220. A transmission axis of the second polarizing plate 212 is perpendicular to the transmission axis of the first polarizing plate 211.

The backlight unit 230 includes a light source 232 which is mounted on a printed circuit board 231, a light guide plate 233 which converts light incident thereon from the light source 232 into a surface light source corresponding to the display area of the liquid crystal panel 220, and a plurality of optical films 235 and 236 laminated on the light guide plate 233.

The optical films 235 and 236 includes a diffusion sheet 235 which diffuses light in order to increase the uniformity of the light radiated from the backlight unit across all areas, and a prism sheet 236 which concentrates light in order to control the area of light emission. Here, the prism sheet 236 is the optical film 100 according to the above embodiment, described with reference to FIGS. 2 to 4.

The bottom cover 240 accommodates the liquid crystal panel 220, the backlight unit 230, a bottom reflector 234, and the guide panel 250. The bottom reflector 234 is disposed under the light guide plate 233 of the backlight unit 230 to reflect light emitted in a downward direction from the light guide plate 233.

The guide panel 250 supports the liquid crystal panel 220. Thus, the guide panel 250 can prevent the liquid crystal panel 220 from moving in the bottom cover 240.

The top cover 260 supports the upper portion of the liquid crystal panel 220 and is fastened to the bottom cover 240.

As described above, the optical film 100 according to the embodiment of the present invention is provided as the prism sheet 236 which is one of the optical films disposed on the light guide plate 233.

Figure 3:
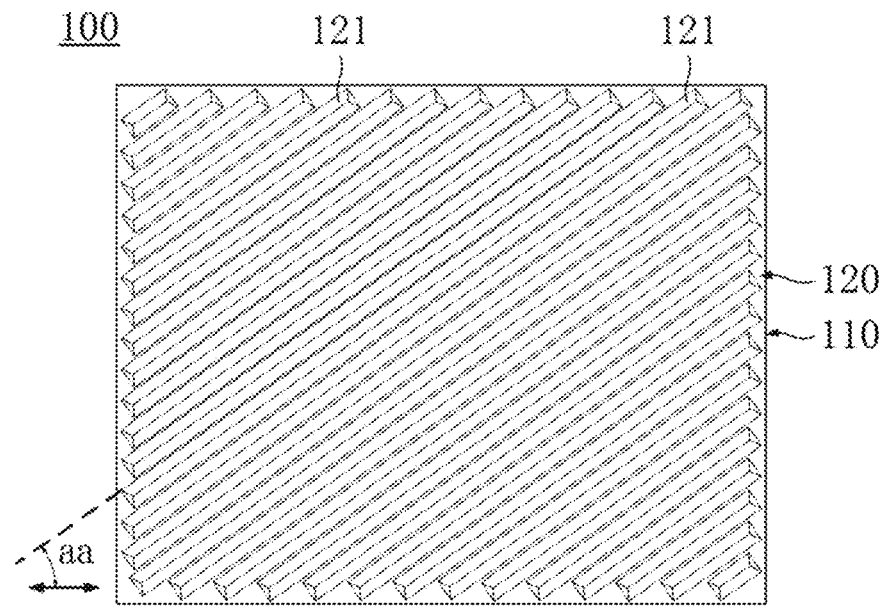
FIG. 3 is a top view of FIG. 2.

In detail, the prism sheet 236 of FIG. 5 includes a reflective polarizing part 110 and a prism part 120, similar to that illustrated in FIGS. 2 to 4. In one embodiment, the prism part 120 is an integral part of the reflective polarizing part 110 so that it is single piece in which the angle (aa) is defined and set at the time the prism sheet 236 is formed. The angle (aa) is selected according to a desired performance and response relative to polarizing axis of part 110 when the integral sheet is formed so that this angle is preset for that particular prism sheet 236. In another embodiment, the prism part 120 is a separate sheet having a thin, transparent supporting base layer on which all the prism patterns 121 are formed. In this alternative embodiment, the angle (aa) of the prism sheet can be varied and thus select independent of the polarizing axis of the either the reflective polarizing part 110 and also of first polarizing plate 211.

In one preferred embodiment disclosed herein, the first polarizing plate 211, which is disposed between the liquid crystal panel 220 and the backlight unit 230 in the LCD device 200 of FIG. 5, has the same transmission axis as that of the reflective polarizing part 110.

Figure 6:
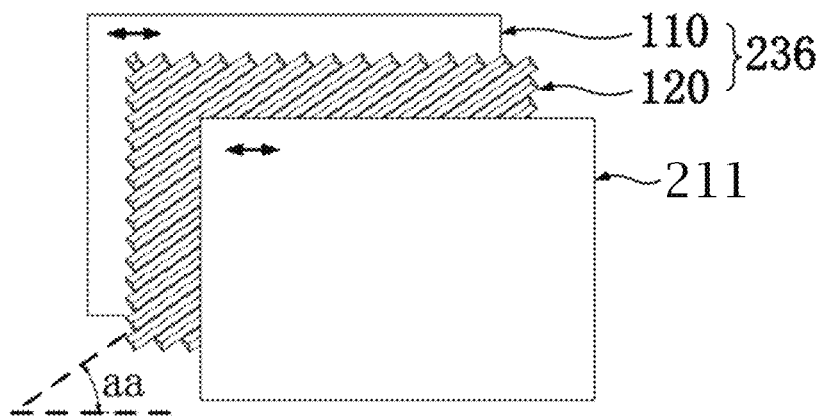
FIG. 6 is a view illustrating an example of a transmission axis of a reflective polarizing part, a prism part, and a transmission axis of a lower polarizing plate in FIG. 5.

That is, as illustrated in FIG. 6, the transmission axis of the first polarizing part 211 (indicated by the horizontal arrow in FIG. 6) coincides with the transmission axis of the reflective polarizing part 110 of the prism sheet 236. Consequently, the luminance deteriorating of the LCD device caused by the prism sheet 236 can be prevented.

Figure 7:
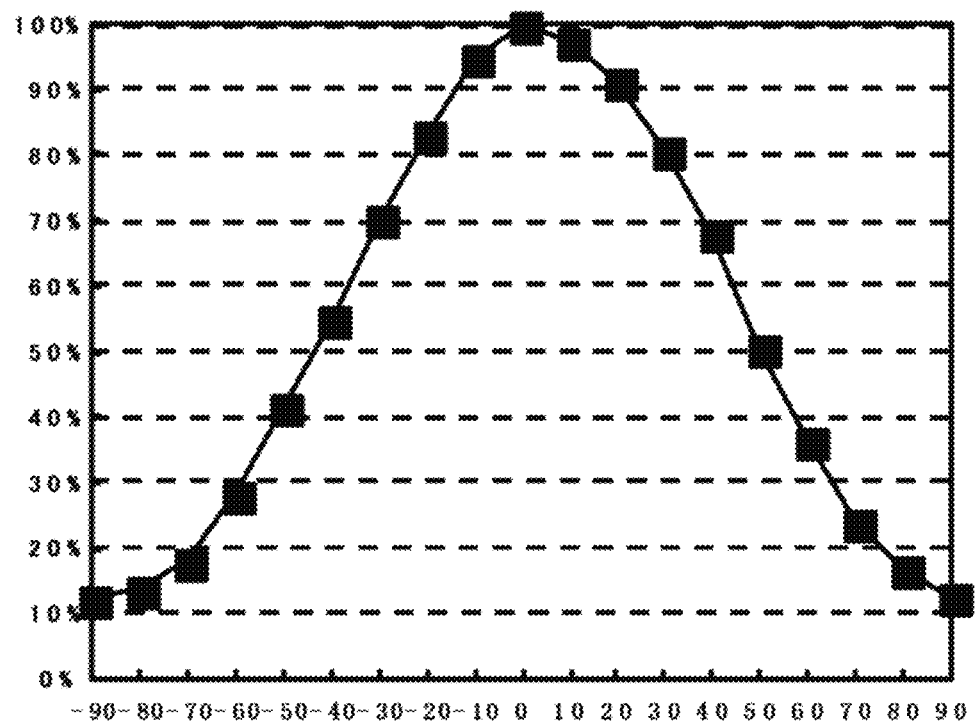
FIG. 7 is a graph illustrating variation in luminance depending on the angle at which the transmission axis of the reflective polarizing part is tilted relative to the transmission axis of the lower polarizing plate.

Specifically, as illustrated in FIG. 7, when the angle at which the reflective polarizing part 110 is tilted relative to the first polarizing plate 211 (hereinafter, referred to as a "tilt angle", referring to the horizontal axis of FIG. 7) is 0°; that is, when the transmission axis of the reflective polarizing part 110 of the prism sheet 236 coincides with the transmission axis of the first polarizing plate 211, luminance (referring to the vertical axis of FIG. 7) is 100%. On the other hand, as the tilt angle is increased, light is significantly lost when transmitted through the prism sheet 236 and the first polarizing plate 211. For this reason, luminance is gradually decreased.

Accordingly, when the tilt angle at which the reflective polarizing part 110 is inclined relative to the first polarizing plate 211 is 0°, as in the embodiment of the present invention, the luminance deterioration caused by the prism sheet 236 can be prevented.

The following Table 1 indicates luminance in low- and high-resolution LCD devices applying a typical, prior art prism sheet and luminance in the same devices applying the prism sheet according to an embodiment of the present invention. Both of which have sizes of 5.5 inches. Here, the high-resolution LCD device includes four times as many pixel areas as the low-resolution LCD device. The typical, prior art prism sheet is an optical film including a reflective polarizing part and a prism part, which are integrally formed with the angle of the rows of prism parts fixed relative to the polarizing axis of the sheet below it. In order to reduce a Moiré phenomenon in this typical prism sheet, the prism patterns of the prism part could be tilted at a predetermined aligned angle, thereby requiring that the reflective polarizing part to be tilted along with the prism patterns.

TABLE 1

|  | Low-resolution luminance | High-resolution luminance |
|---|---|---|
| Typical prism sheet | 662 | 294 |
| Prism sheet according to embodiment of present invention | 808 | 362 |

As described above, the typical prism sheet includes the reflective polarizing part and the prism part which are integrally formed as a single sheet. Accordingly, when the rows of the prism patterns of the prism part are tilted at a predetermined aligned angle relative to the first polarizing plate in order to reduce a Moiré phenomenon, a transmission axis of the reflective polarizing part is also tilted together therewith. Thus, since the transmission axis of the reflective polarizing part is inclined at a predetermined tilt angle relative to a transmission axis of a first polarizing plate disposed beneath a liquid crystal panel, light is lost when transmitted through the prism sheet and the first polarizing plate.

On the other hand, according to the embodiment of the present invention, the reflective polarizing part 110 is fixed so as to have the same transmission axis as the first polarizing plate 211, and only a plurality of prism patterns 121 of the prism part 120 are tilted at a predetermined aligned angle. Therefore, it is possible to prevent light from being lost when the light is transmitted through the prism sheet and the first polarizing plate. This predetermined aligned angle of the prism patterns can be selected at the time of making the reflective polarizing part 110 so that it is integral with and fixed relative to that sheet or can be accomplished by having the prism part 120 be on a separate sheet this is placed at the desired angle relative to the reflective polarizing part 110 and the first polarizing plate 211, As indicated in Table 1, when the optical film according to the embodiment of the present invention is provided as a prism sheet, the prism sheet has a higher luminance than the typical prism sheet in both low- and high-resolution LCD devices.

The prism patterns 121 included in the prism part 120 of the prism sheet 236 are tilted at a predetermined aligned angle (aa) relative to the transmission axes of the first polarizing plate 211 and the reflective polarizing part 110.

Particularly, when the aligned angle (aa) is an angle of 30° to 60°, a Moiré phenomenon occurring even in a high-resolution LCD device by prism sheet 236 can be prevented.

In addition, when the aligned angle (aa) is an angle of 30° to 60°, the viewing angle of the LCD device 200 may be enlarged owing to the concentration of light by the prism patterns which are obliquely arranged.

That is, as indicated in the following Table 2, when the aligned angle (aa) is an angle less than 30° or an angle equal to or greater than 90°, a horizontal half-luminance angle is 41 or less, and a vertical half-luminance angle is 39 or less. Here, the half-luminance angle in Table 2 means a width of an effective area in which luminance is 50% or more, among the viewing areas of an LCD device.

Meanwhile, when the aligned angle (aa) is an angle of 30°, 40°, or 45° in the range from 30° to 60°, the horizontal half-luminance angle is 43 or more, and the vertical half-luminance angle width is 39 or more.

As such, when the aligned angle (aa) is selected from the range from 30° to 60°, the horizontal and vertical viewing angles of the LCD device 200 are enlarged, compared to when the aligned angle (aa) is an angle less than 30° or more than 60°.

TABLE 2

| Aligned angle (aa) | 0° | 10° | 30° | 40° | 45° | 90° | 135° |
|---|---|---|---|---|---|---|---|
| Half-luminance angle (horizontal/vertical) | 39/35 | 40/35 | 43/39 | 44/40 | 45/40 | 41/39 | 45/39 |

As described above, the LCD device 200 according to the embodiment of the present invention includes the optical film 100, which includes the reflective polarizing part 110 having the same transmission axis as the first polarizing plate 211 disposed in the lower portion of the liquid crystal panel 220, as the prism sheet 236, so that deterioration of luminance by the prism sheet 236 can be prevented.

In addition, since the prism part 120 of the prism sheet 236 includes the prism patterns 121 having the rows arranged at an incline relative to the transmission axes of the reflective polarizing part 110 and the first polarizing plate 211, the prism sheet can prevent a Moiré phenomenon and thus the LCD device 200 can have improved image quality.

In particular, since the predetermined aligned angle (aa), at which the prism patterns 121 are tilted relative to the transmission axes of the reflective polarizing part 110 and the first polarizing plate 211, is selected from the range from 30° to 60°, it is possible to prevent a Moiré phenomenon from occurring even in a high-resolution LCD device. In addition, a viewing angle can be further enlarged owing to the concentration of light by the prism patterns which are obliquely arranged.

As is apparent from the above description, an optical film according to an embodiment of the present invention includes a prism part which consists of a plurality of prism patterns which is obliquely arranged relative to the transmission axis of a reflective polarizing part. In this case, the transmission axis of the reflective polarizing part is arranged so as to coincide with one of the column and row arrangements of pixel areas.

Consequently, since the arrangement of the rows of the prism patterns which are obliquely arranged matches none of the row and column arrangements of the pixel areas, a Moiré phenomenon caused by the optical film can be prevented.

In particular, the aligned angle at which the rows of the prism patterns are tilted may be an angle of 30° to 60°. Thus, even when the optical film is applied to high-resolution LCD devices, it is possible to prevent a Moiré phenomenon.

The viewing angle of an LCD device can be further enlarged owing to the concentration of light by the prism patterns which are tilted at an angle of 30° to 60°.

In addition, the optical film according to the embodiment of the present invention includes the reflective polarizing part having the same transmission axis as a first polarizing plate disposed beneath a liquid crystal panel. Consequently, the luminance deterioration of the LCD device caused by the optical film can be prevented.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
    a liquid crystal panel having at least one row of pixels and one column of pixels;
    a backlight unit to transmit light to the liquid crystal panel, which includes an optical film beneath the liquid crystal panel, the optical film comprising:
    a reflective polarizing part configured to reflect light from a first polarization axis and transmit light through a second polarization axis perpendicular to the first polarization axis, wherein the second polarization axis is a transmission axis of the reflective polarizing part and coincides with one of either the row or the column of pixels in the liquid crystal panel, the reflective polarizing part being laminated from a plurality of material layers, the material layers including a plurality of layers having an index of refraction that are different from each other along the first polarization axis but match each other along the second polarization axis; and
    a prism part overlying the reflective part, the prism part comprising a plurality of prism patterns arranged in parallel rows, each prism pattern being obliquely disposed at a predetermined angle of inclination relative to the second polarization axis and also relative to one of either the row or the column of the pixels in the liquid crystal panel to reduce the Moiré effect; and
    a first polarizing plate disposed between the optical film and the liquid crystal panel, the first polarizing plate having a transmission axis that coincides with the second polarization axis of the reflective polarizing part to polarize light radiate to the liquid crystal panel from the backlight unit.

2. The liquid crystal display device according to claim 1, further comprising a second polarizing plate disposed on the liquid crystal panel to polarize light emitted from the liquid crystal panel,
    wherein the second polarizing plate has a transmission axis perpendicular to the transmission axis of the first polarizing plate.

3. The liquid crystal display device according to claim 1, wherein the predetermined angle of inclination of each of the prism patterns is about 45° relative to the second polarization axis.

4. The liquid crystal display device according to claim 1, wherein the backlight unit further comprises:
    a light source mounted on a printed circuit board;
    a light guide plate to convert incident light from the light source into a surface light source corresponding to a display area of the liquid crystal panel; and
    a plurality of laminated optical films disposed on the light guide plate,
    wherein the plurality of laminated optical films includes
    a diffusion sheet to increase uniformity of light radiated from the light guide plate across the display area, and
    a prism sheet as the optical film, to concentrate light and control an area of light emission.

5. A liquid crystal display device comprising:
    a liquid crystal panel having at least one row of pixels and one column of pixels;
    a backlight unit to transmit light to the liquid crystal panel, which includes an optical film beneath the liquid crystal panel, the optical film comprising:
    a reflective polarizing part configured to reflect light from a first polarization axis and transmit light through a second polarization axis perpendicular to the first polarization axis, wherein the second polarization axis is a transmission axis of the reflective polarizing part and coincides with one of either the row or the column of pixels in the liquid crystal panel, the reflective polarizing part being laminated from a plurality of material layers, the material layers including a plurality of layers having an index of refraction that are different from each other along the first polarization axis but match each other along the second polarization axis; and
    a prism part overlying the reflective part, the prism part comprising a plurality of prism patterns arranged in parallel rows; and
    a first polarizing plate disposed between the optical film and the liquid crystal panel, the first polarizing plate having a transmission axis that coincides with the second polarization axis of the reflective polarizing part to polarize light radiate to the liquid crystal panel from the backlight unit.

6. A liquid crystal display device comprising:
    a liquid crystal panel having at least one row of pixels and one column of pixels;
    a backlight unit to transmit light to the liquid crystal panel, which includes an optical film beneath the liquid crystal panel, the optical film comprising:
    a reflective polarizing part configured to reflect light from a first polarization axis and transmit light through a second polarization axis perpendicular to the first polarization axis, wherein the second polarization axis is a transmission axis of the reflective polarizing part and coincides with one of either a row or a column of an array of pixel areas, the reflective polarizing part being laminated from a plurality of material layers, the material layers including a plurality of layers having an index of refraction that are different from each other along the first polarization axis but match each other along the second polarization axis; and
    a prism part overlying the reflective part, the prism part comprising a plurality of prism patterns arranged in parallel rows, each prism pattern being disposed at an oblique angle relative to the row or column of pixels in the liquid crystal panel and also being at a predetermined angle of inclination relative to the second polarization axis to reduce a Moiré phenomenon; and
    a first polarizing plate disposed between the optical film and the liquid crystal panel, the first polarizing plate having a transmission axis that coincides with the second polarization axis of the reflective polarizing part to polarize light radiate to the liquid crystal panel from the backlight unit.

* * * * *